US010555510B2

(12) United States Patent
Halse et al.

(10) Patent No.: US 10,555,510 B2
(45) Date of Patent: Feb. 11, 2020

(54) FISH PUMPING SYSTEM AND METHOD (71) Applicant: Cooke Aquaculture Inc., Blacks Harbour (CA)

(72) Inventors: Joel Halse, Saint Andrews (CA); David Falkjar, Upper Letang (CA)

(73) Assignee: COOKE AQUACULTURE INC., Blacks Harbour (CA)

( * ) Notice: Subject to any disclaimer, the term of this patent is extended or adjusted under 35 U.S.C. 154(b) by 103 days.

(21) Appl. No.: 15/522,910

(22) PCT Filed: Oct. 28, 2015

(86) PCT No.: PCT/CA2015/051101
§ 371 (c)(1),
(2) Date: Apr. 28, 2017

(87) PCT Pub. No.: WO2016/065474
PCT Pub. Date: May 6, 2016

(65) Prior Publication Data
US 2017/0325432 A1 Nov. 16, 2017

Related U.S. Application Data (63) Continuation-in-part of application No. 14/121,860, filed on Oct. 28, 2014, now Pat. No. 9,717,258.

(30) Foreign Application Priority Data

Oct. 28, 2014 (CA) ..................................... 2869084

(51) Int. Cl.
A01K 79/00 (2006.01)
B65G 53/30 (2006.01)

(52) U.S. Cl.
CPC .............. A01K 79/00 (2013.01); B65G 53/30 (2013.01)

(58) Field of Classification Search
CPC ................................ A01K 79/00; A22C 25/08
See application file for complete search history.

(56) References Cited

U.S. PATENT DOCUMENTS

| 2,736,121 A | 2/1956 | Kimmerle |
| 2,943,578 A | 7/1960 | McCombie |

(Continued)

FOREIGN PATENT DOCUMENTS

| CA | 2869084 C | 6/2018 |
| GB | 2042641 B | 9/1980 |

(Continued)

OTHER PUBLICATIONS

International Search Report of PCT/CA2015/051101 dated Jan. 12, 2016.

(Continued)

Primary Examiner — Craig M Schneider
Assistant Examiner — Angelisa L. Hicks
(74) Attorney, Agent, or Firm — Bereskin & Parr LLP (57) ABSTRACT A fish pumping system for moving upload water and fish includes a buffer pipe section having an upstream end and a downstream end. An inlet valve assembly is at the upstream end and provides fluid communication between the buffer pipe and an upstream fish origin. An outlet valve assembly is at the downstream end 5 and provides fluid communication between the buffer pipe and a fish destination. An inlet branch pipe is in fluid communication with the upstream end and an outlet branch pipe is in fluid communication with the downstream end. A production water piping circuit is in communication with the inlet branch pipe and the outlet branch pipe and forms a loop with the buffer pipe section. The 10 production water circuit pumps production water (Continued)

into the buffer pipe section through the inlet branch pipe and out from the buffer pipe section through the outlet branch pipe.

17 Claims, 5 Drawing Sheets

(56) References Cited

U.S. PATENT DOCUMENTS

| | | | |
|---|---|---|---|
| 3,038,760 A | 6/1962 | Crooke | |
| 3,254,924 A * | 6/1966 | Milton | A01K 79/00 406/105 |
| 3,413,039 A | 11/1968 | Asgeirsson | |
| 3,583,365 A | 6/1971 | Harden | |
| 3,795,325 A | 3/1974 | McLean | |
| 3,871,332 A * | 3/1975 | Hayashi | A01K 79/00 119/203 |
| 3,918,116 A | 11/1975 | Valdespino | |
| 4,000,927 A | 1/1977 | Sakamoto et al. | |
| 4,046,996 A | 9/1977 | Williams et al. | |
| 4,154,484 A | 5/1979 | Holzenberger | |
| 4,193,737 A | 3/1980 | Lemmon | |
| 4,293,250 A | 10/1981 | Hayashi | |
| 4,394,259 A * | 7/1983 | Benny | A01K 79/00 209/143 |
| 4,449,862 A | 5/1984 | Beck | |
| 4,490,044 A | 12/1984 | Saito et al. | |
| 4,551,042 A | 11/1985 | Hagedorn et al. | |
| 4,558,990 A | 12/1985 | Roach | |
| 4,586,853 A | 5/1986 | Sweeney et al. | |
| 4,611,955 A | 6/1986 | Doerr | |
| 4,702,676 A | 10/1987 | Westfall et al. | |
| 4,756,671 A | 7/1988 | Grimes et al. | |
| 4,768,920 A | 9/1988 | Gurth | |
| 4,770,610 A | 9/1988 | Breckner | |
| 4,826,362 A | 5/1989 | Hayashi | |
| 4,884,925 A | 12/1989 | Kemp et al. | |
| 4,892,123 A | 1/1990 | Sheehan | |
| 5,002,463 A | 3/1991 | Breckner et al. | |
| 5,018,946 A | 5/1991 | Breckner et al. | |
| 5,078,579 A | 1/1992 | Ryan | |
| 5,201,877 A | 4/1993 | Relin | |
| 5,284,338 A | 2/1994 | Volk et al. | |
| 5,284,388 A | 2/1994 | Volk et al. | |
| 5,549,422 A | 8/1996 | Shepard | |
| 5,697,116 A | 12/1997 | Loferer | |
| 5,779,355 A | 7/1998 | Pulllman | |
| 6,161,504 A | 12/2000 | Jungling et al. | |
| 7,462,016 B2 | 12/2008 | Lindgren et al. | |
| 8,109,698 B2 | 2/2012 | De Greef | |
| 8,230,813 B1 | 7/2012 | Birdwell | |
| 2002/0015621 A1 | 2/2002 | Vatne et al. | |
| 2003/0185637 A1 | 10/2003 | D'Aquin | |
| 2009/0142146 A1 | 6/2009 | Opatril | |
| 2009/0252563 A1 | 10/2009 | Gillespie | |
| 2011/0047743 A1 | 3/2011 | Shepherd | |
| 2011/0188949 A1 | 8/2011 | Foody, Sr. | |
| 2011/0311321 A1 | 12/2011 | Trueman | |
| 2013/0336730 A1 | 12/2013 | Alenizi | |
| 2015/0016898 A1 | 1/2015 | Hockett et al. | |
| 2017/0000094 A1 | 1/2017 | Bartsch | |

FOREIGN PATENT DOCUMENTS

| | | | |
|---|---|---|---|
| JP | 5544486 | 3/1980 | |
| JP | S57203614 A | 12/1982 | |
| JP | 61140413 | 6/1986 | |
| WO | WO 02078436 A1 * | 10/2002 | A01K 79/00 |
| WO | 2016065474 A1 | 5/2016 | |

OTHER PUBLICATIONS

Extended European Search Report of EP15853725.8 dated Jun. 25, 2018.

* cited by examiner

FISH PUMPING SYSTEM AND METHOD

This application is a national phase entry of PCT Patent Application No. PCT/CA2015/051101, filed Oct. 28, 2015, which claims the benefit of U.S. patent application Ser. No. 14/121,860, filed on Oct. 28, 2014, and Canadian Patent Application No. 2,869,084, filed on Oct. 28, 2014, the contents of which are both incorporated herein by reference in their entirety.

FIELD

The specification relates to fish pumps, and more particularly to systems and methods for moving fish from an origin such as a fishing vessel to a destination such as a fish processing plant.

BACKGROUND

Fish pumps can be used in the fishing industry to transfer fish from a fishing vessel to a fish processing plant, for example.

U.S. Pat. No. 3,871,332 (Takeshi) purports to disclose an apparatus for sucking up and transferring fish that has a hermetically closed tank connected to a fish water suction pipe and to a fish transfer pipe. A fish water sucking up operation through the fish water suction pipe and a fish transferring operation through the fish transfer pipe are alternately changed over, whereby fish caught can be transferred to any desired place with the aid of a mechanical means with a high efficiency.

SUMMARY

The following summary is intended to introduce the reader to various aspects of the specification, but not to define or delimit any invention.

Disclosed herein is a pumping system and method that can be particularly suitable for pumping fish such as large salmon. In some examples, the pumping system and method may reduce, prevent, or inhibit bruising or other damage to the fish.

According to some aspects, a fish pumping system for moving upload water and fish includes a buffer pipe section having an upstream end and a downstream end. An inlet valve assembly is at the upstream end and provides fluid communication between the buffer pipe and an upstream fish origin. An outlet valve assembly is at the downstream end and provides fluid communication between the buffer pipe and a fish destination. An inlet branch pipe is in fluid communication with the upstream end, and an outlet branch pipe is in fluid communication with the downstream end. A production water piping circuit is in fluid communication with the inlet branch pipe and the outlet branch pipe and forms a loop with the buffer pipe section. The production water circuit includes a pump and valves for selectively pumping production water into the buffer pipe section through the inlet branch pipe and out of the buffer pipe section through the outlet branch pipe, for moving upload water and fish through the buffer pipe section.

The buffer pipe section may have a constant inner diameter along a length thereof.

The inlet valve assembly may include an inlet one-way valve. The inlet branch pipe may be downstream of the inlet one way valve. The outlet valve assembly may include an outlet one-way valve. The outlet branch pipe may be upstream of said outlet one-way valve.

The fish pumping system may further include a respective strainer in each of the inlet valve assembly and the outlet valve assembly.

According to some aspects, a fish pumping system for moving upload water and fish includes an upload pipe section, a buffer pipe section, and a fish delivery pipe section. An inlet valve assembly is between the upload pipe section and the buffer pipe section, and an outlet valve assembly is between the buffer pipe section and the fish delivery pipe section. An inlet branch pipe extends from the inlet valve assembly and an outlet branch pipe extends from the outlet valve assembly. A production water piping circuit is connected to the inlet branch pipe and to the outlet branch pipe and forms a loop with the buffer pipe section. The production water circuit includes a pump and valves for selectively pumping production water into the buffer pipe section through the inlet branch pipe and out from the buffer pipe section through the outlet branch pipe, for moving upload water and fish through the buffer pipe section.

The upload pipe section, buffer pipe section, and fish delivery pipe section may have a same constant inner diameter.

The inlet valve assembly may include an inlet one way valve between the upload section and the buffer pipe section, and the outlet valve assembly may include an outlet one way valve between the buffer pipe section and the fish delivery pipe section.

The fish pumping system may further include a reservoir of production water connected to the production water piping circuit.

The fish pumping system may further include a vacuum system for removing air from the buffer pipe section and from the production water piping circuit.

The fish pumping system may further include a water makeup pipe circuit for recycling the upload water to a fish origin.

The fish pumping system may further include a controller for controlling operation of the pump and the valves.

The upload pipe section, buffer pipe section, and fish delivery pipe section may have an inside diameter of between about 10 inches and 14 inches. The buffer pipe section may have a length of at least 60 feet.

The outlet branch pipe may be upstream from the outlet one-way valve, and the inlet branch pipe may be downstream from the inlet one-way valve.

The makeup pipe circuit may include a makeup pump for pumping makeup water into the production water piping circuit.

The fish pumping system may further include a respective strainer in each of the inlet valve assembly and the outlet valve assembly.

A method for pumping fish through a pipe section includes a) filling the pipe section with production water; b) drawing production water out of the pipe section through a downstream end of the pipe section to induce a flow of upload water and fish through an upstream end of the pipe section; c) pumping production water into the upstream end of the pipe section to induce a flow of the upload water and fish through the pipe section and out of the pipe section through the downstream end of said pipe section.

The step of drawing and the step of pumping may be effected serially. Step b) can include pumping production water into a reservoir, and step c) can include drawing production water from the reservoir.

The step of drawing production water out of the pipe section through the downstream end of the pipe section can include drawing production water through an outlet branch pipe in fluid communication with the downstream end of the pipe section. The step of pumping production water into the upstream end of the pipe section can include pumping production water through an inlet branch pipe in fluid communication with the upstream end of said pipe section.

The method can further include a step of passing the production water through a strainer prior to pumping the production water into the outlet branch pipe.

The pipe section can have a diameter of between about 10 inches and about 14 inches. The steps of drawing production water from the pipe section and the step of pumping production water into the pipe section can be repeated at about 20 second intervals.

The pipe section can have an inlet valve assembly at an upstream end thereof and an outlet valve assembly at a downstream end thereof. The method may further include the step of inhibiting the production water from passing through the outlet valve assembly.

According to some aspects, there is provided a constant-diameter pumping system for moving upload water and fish therealong. The constant-diameter fish pumping system includes a buffer pipe section having a uniform inside diameter. This buffer pipe section has an inline inlet one-way valve at an inlet end thereof and an inline outlet one-way valve at an outlet end thereof. The inlet one-way valve has an inlet branch pipe extending therefrom and the outlet one-way valve has an outlet branch pipe extending therefrom. The constant-diameter pumping system also includes a production water piping circuit connected to the inlet branch pipe and to the outlet branch pipe and forming a loop with the buffer pipe section. The production water circuit comprises a pump for pumping production water into the buffer pipe section through the inlet branch pipe and out from the buffer pipe section through the outlet branch pipe. The production water circuit also has valves for alternately controlling a flow of production water in and out of the buffer pipe section for moving upload water and fish along the buffer pipe section.

According to some aspects, there is provided a method for pumping fish along a constant-diameter pipe section, including the steps of: filling the pipe section with production water; drawing the production water out of the pipe section through a downstream end of the pipe section and simultaneously inducing a flow of upload water and fish through an upstream end of the pipe section; pumping production water into the upstream end of the pipe section and causing a flow of upload water and fish along the pipe section and out of the pipe section through the downstream end of the pipe section.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

An example fish pumping system and method is described hereinbelow with reference to the attached drawings. The fish pumping system and method may be used to move fish, e.g. salmon, together with water (also called upload water) from a fish origin such as a fishing vessel or boat to a fish destination such as a fish processing plant.

Figures 1, 2, 3:
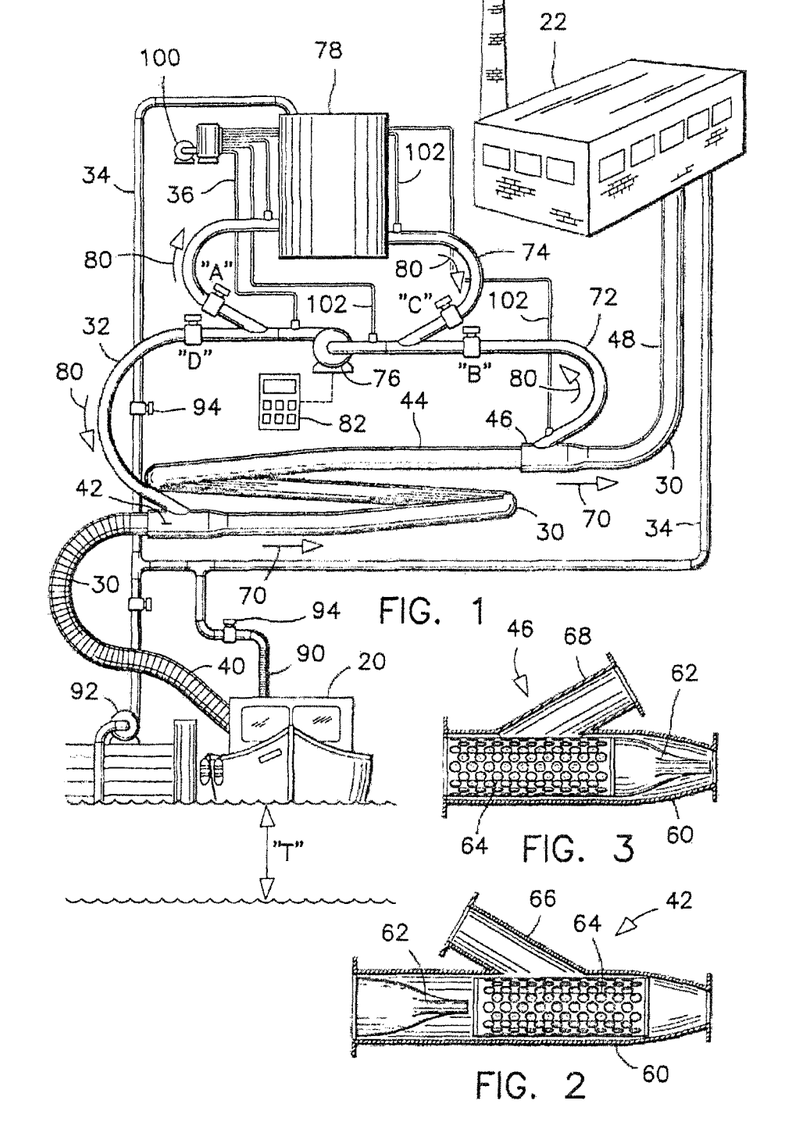
FIG. 1 is a schematic view of an example fish pumping system.
FIG. 2 is a longitudinal cross-sectional view of the inlet valve assembly of FIG. 1.
FIG. 3 is a longitudinal cross-sectional view of the outlet valve assembly of FIG. 1.

Referring to FIG. 1, reference numeral 20 is used to designate a fishing boat and reference numeral 22 is used to designate a fish processing plant where a load of fish is being transferred from to the boat 20.

The piping system illustrated in FIG. 1, includes four sub-systems, which are identified by four different pipe sizes, to facilitate the understanding of the drawings. The first sub-system is a fish-path piping system 30, through which fish travel. In some examples, the inside diameter along this fish-path piping system 30 is generally constant along the length of the fish-path piping system, and is substantially large. In such examples, the fish-path piping system may also be referred to as a "constant diameter fish-path piping system", and the system may also be referred to as a "constant diameter fish pumping system". Providing a constant diameter fish path piping system can prevent, reduce, or inhibit shock and stress to the fish. For example, providing a constant diameter fish path piping system can prevent, reduce, or inhibit shock to the fish from funneling passages and other piping constrictions.

In the example shown, the fish-path piping system 30 extends from the fishing boat 20 to the fish processing plant 22.

The second sub-system is a production water circuit 32. The production water circuit 32 is used to force a flow of water through the fish-path piping system 30.

The third sub-system is the offload and makeup water piping 34 to replenish the previously-mentioned sub-systems with water.

The fourth sub-system is the priming system 36 to remove air from the entire pumping system.

Referring firstly to the fish-path piping system 30, in the example shown, this piping system has a generally constant inner diameter along its length. The inner diameter may in some examples be at least ten (10) inches or within the range of about ten (10) inches to fourteen (14) inches along the full length thereof, depending on the size and volume of fish being moved per hour.

In the example shown, the fish-path piping system 30 has a flexible upload pipe section 40, capable of being manipulated into the hold of the fishing boat 20. In order to accommodate movement of the boat 20, the upload pipe section 40 may be made of a flexible hose.

The upload pipe section 40 is in fluid communication with and connects to an inlet valve assembly 42. In the example shown, the inlet valve assembly 42 is at the upstream end of a buffer pipe section 44. The buffer pipe section 44 may in some examples have a length of about sixty (60) to eighty (80) feet. At the downstream end of the buffer pipe section 44 is an outlet valve assembly 46. This outlet valve assembly 46 is in fluid communication with and connects to a fish delivery pipe section 48. The buffer pipe section 44 is illustrated as a coil for convenience only. This buffer pipe section 44 can have many configurations.

While still making reference to the fish-path piping system 30, the fishing boat 20 may be subject to the variations of the tides. The tides could vary in height "T" up to thirty (30) feet, such as in the Bay of Fundy, Canada, for example. The fish delivery section 48 may represent a substantial head as well. These pressure losses and the movement of the boat 20 can be considered in the design and operation of the pumping system.

Referring particularly to the inlet and outlet valve assemblies 42, 46, as can be seen in FIGS. 2 and 3, these valve assemblies can have a similar construction. In the example shown, both valve assemblies are in line, and include a one-way valve. More specifically, the valve assemblies 42, 46, each have a casing 60, a duck-bill type flexible one-way or check valve 62, and a strainer 64 mounted inside the casing 60. The strainer 64 is mounted downstream of the check valve 62 in the inlet one-way valve 42 and the strainer 64 is mounted upstream of the check valve 62 in the outlet one-way valve 46. The strainers 64 can separate fish from production water being pumped in or out of the buffer section 44. The inlet and outlet valve assemblies 42, 46 have a water intake branch 66 and a water outlet branch 68 respectively, connecting the production water circuit 32 to the valve assemblies 42, 46. The strainer of the outlet valve assembly directs strained water into the water outlet branch 68. The production water is passed through the strainer 64 of the outlet valve assembly 46 prior to pumping it out of outlet branch pipe 68, and this production water is passed through the strainer 64 of the inlet valve assembly 42 when pumping it through the inlet branch pipe 66.

The expression "production water" is used herein to designate water that is used to force and/or enhance flow in the buffer pipe section 44. In the example shown, when the buffer pipe section 44 is full of production water, this production water is forcefully drawn from the downstream end of the buffer pipe section 44 to create a negative pressure in the upstream end of the buffer pipe section 44, to force flow of upload water and fish into the buffer pipe section 44. This production water is also fed under pressure into the upstream end of the buffer pipe section 44 to force the content of the buffer pipe section to move along the buffer pipe section and out through to the downstream end. This production water can be re-circulated and used again and again to force second and subsequent hauls of upload water and fish in and out of the buffer pipe section 44.

Arrows 70 indicate the directions of flow along the fish-path piping system 30.

In the example shown, the production water circuit 32 includes a first loop 72, a second loop 74, a water pump 76, control valves and a production water reservoir 78. The arrows 80 indicate the directions of flows in both loops 72, 74. The control valves in both loops 72, 74 are labelled "A", "B", "C" and "D".

The pump 76 in the production water circuit 32 may in some examples have a capacity of 1800 gpm at 35 psi.head pressure; and 28 inches of mercury suction pressure. The pump 76 may be a centrifugal-type water pump, driven by a 60 hp. electric motor. The pump 76 may be controlled (i.e. turned on and off) by a PLC (programmable logic controller) or other automatic controller 82. The same controller 82 may also be used to control the opening and closing of the valves "A", "B", "C" and "D". The capacity of the pump may be selected to move the entire content of the buffer pipe section 44 in a relatively short time. The pump 76 may be mounted in the production water circuit 32 to pump production water from the downstream end of buffer pipe section 44 to the reservoir 78 and from the reservoir 78 to the upstream end of the buffer pipe section 44.

In the example shown, the offload and makeup water piping system 34 recycles water from the fish processing plant 22 to the production water reservoir 78. This piping system 34 also provides offload water to the fishing vessel 20 along a flexible branch pipe 90. An optional water makeup branch pipe is also provided and includes a makeup pump 92 for pumping production water into the production water reservoir 78. Valves 94 are installed on this water piping system 34 to control the flow.

Lastly, the priming system 36 includes a vacuum pump 100 and branch pipes 102, each having a connection to a high point in the fish-path piping system 30 and to a high point in the first and second loops 72, 74 of the production water circuit 32. The priming system 36 can remove the air in the fish-path piping system 30 and the production water circuit 32.

Having described the elements of the illustrated fish pumping system, an example of the operation of this system will be described.

An initial step in the operation of the system can include filling the fish-path piping system 30 at least up to the outlet valve assembly 46, and the production water circuit 32 with production water. A second step can include removing air in these pipes.

Starting with an empty or a near-empty production water reservoir 78, with the buffer pipe section 44 full of production water and with the flexible upload hose 40 extending in the hold of the fishing boat 20, the pump 76 is started with valves "A" and "B" open and valves "C" and "D" closed. The segments of the production water circuit 32 which are not used during the initial pumping phase are shown in light dashed lines in FIG. 4 for presenting a better understanding of the flow through the production water circuit 32 during this first pumping phase.

Figure 4:
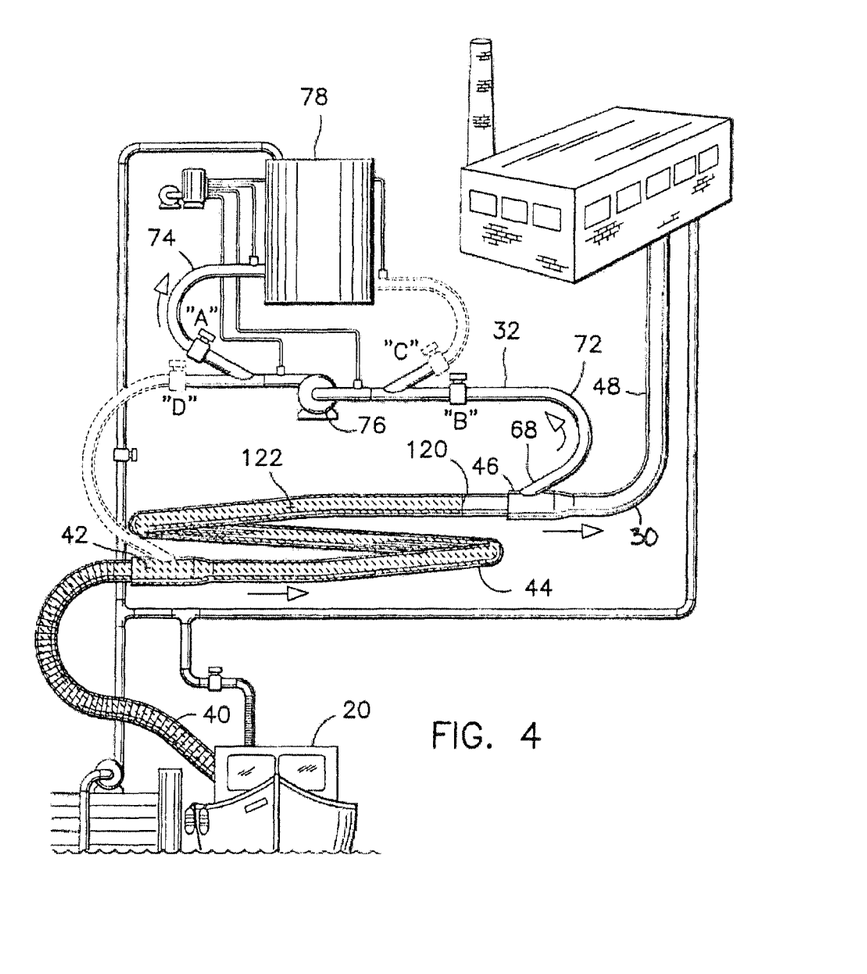
FIG. 4 is a schematic view of the fish pumping system of FIG. 1, showing a first haul of upload water and fish being moved to a first position during a first pumping phase.

During this first pumping phase, the pump 76 is operated to draw production water from the buffer pipe section 44 through the branch pipe 68 of the outlet valve 46, and to force this flow of production water into the production water reservoir 78 through valve "A". This flow of production water from the buffer pipe section 44 creates a negative pressure in the flexible upload pipe section 40 to draw upload water and fish through the fish-path piping system 30 and into the buffer pipe section 44. This first haul of upload water and fish has its leading edge at label 120, for example. The shaded area in FIG. 4 represents the first haul of upload water and fish 122 in the fish-path piping system 30.

After a first haul of upload water and fish 122 has been drawn by negative pressure to fill or to nearly fill the buffer pipe section 44, the pump 76 is stopped and the flow control valves are reversed. Valves "A" and "B" are closed and valves "C" and "D" are opened. The pump 76 is operated again in a second pumping phase. During the second pumping phase, the segments of the pump circuit 32 which are not used are shown in light dashed lines in FIG. 5 for presenting a better understanding of the flow through the production water circuit 32 during this second pumping phase.

Figure 5:
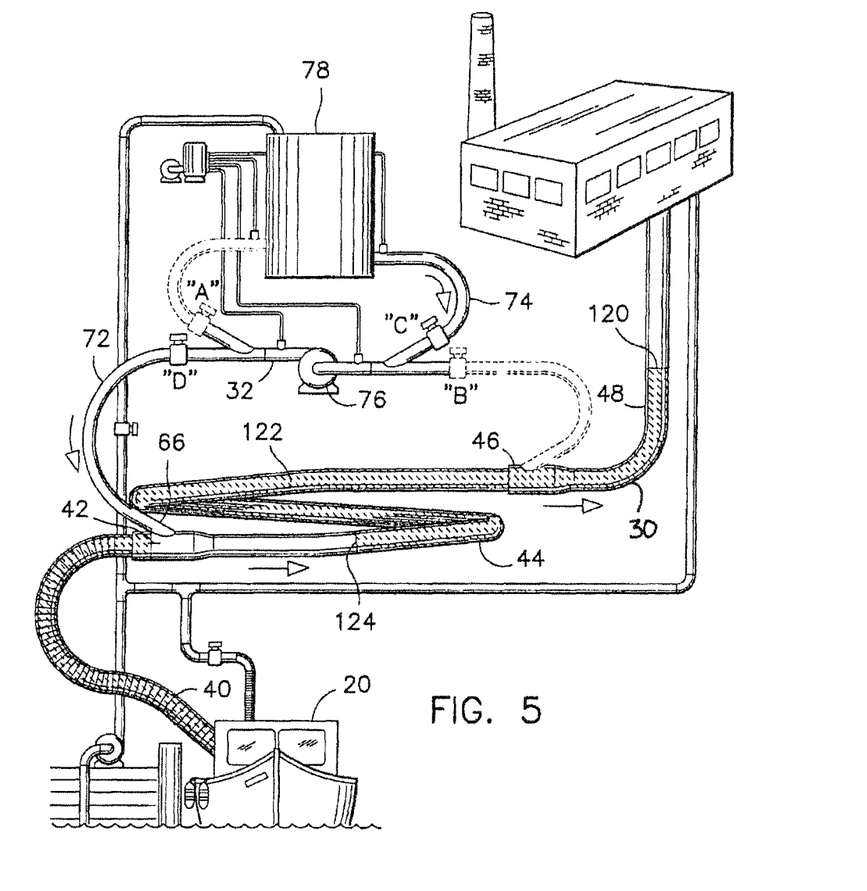
FIG. 5 is a schematic view of the fish pumping system of FIG. 1, showing the first haul of upload water and fish being moved to a second position during a second pumping phase.

During the second pumping phase, the pump 76 is operated to draw production water from the production water reservoir 78 and to force this production water into the branch 66 of the inlet valve assembly 42 and into the upstream end of the buffer pipe section 44. The production water being pumped into the buffer pipe section 44 forces the content of the buffer pipe section 44 to move along the buffer pipe section 44 and out through the outlet valve assembly 46. As can be seen in FIG. 5, the leading edge 120 of a first haul of upload water and fish 122 has now been moved into the fish delivery section 48. The production water being forced into the buffer pipe section 44 has created a trailing edge 124 behind this first haul of upload water and fish 122. In FIG. 5, the first haul of upload water and fish 122 is shown in shaded area inside the fish-path pipe 30, between the leading edge 120 and the trailing edge 124.

Figure 6:
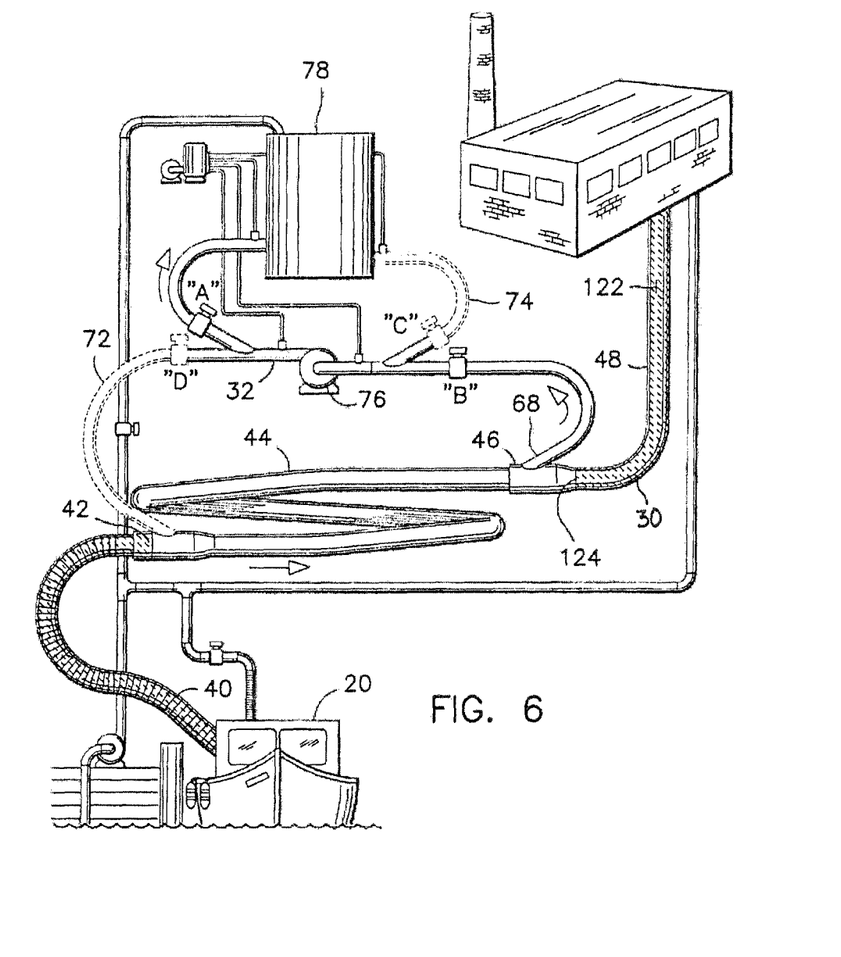
FIG. 6 is a schematic view of the fish pumping system of FIG. 1, showing the location of the first haul of upload water and fish at the end of the second pumping phase, prior to pumping a second haul of upload water and fish into the buffer pipe section.

When the first haul of upload water and fish 122 in the buffer pipe section 44 has been moved out through the outlet valve assembly 46, the pump 76 is stopped and the control valves are operated. Valves "C" and "D" are closed, and valves "A" and "B" are opened, as illustrated in FIG. 6. The pump 76 is started again to repeat the pumping cycle. The pump 76 is operated again to repeat the first pumping phase and to draw production water out from the buffer pipe section 44 and by the same action, to draw by negative pressure a second haul of upload water and fish into the buffer pipe section 44.

The first and second pumping phases mentioned above can be repeated serially until the boat hold is empty. The production water content of the buffer pipe section 44 can be removed from the buffer pipe section 44 at every second pumping phase.

The duration of each pumping phase is selected so as to move each haul of upload water and fish out of the buffer pipe section 44 and into the fish delivery pipe section 48. The duration of each pumping phase is also selected to prevent losing production water into the fish delivery pipe section 48. Each repetition of the first and second pumping phase can constitute one pumping cycle, and pumping cycles can be repeated at a rate of about one cycle every twenty (20) seconds.

The duration of each pumping phase can be based on the pressure losses through the system, on the height of the tide "T" at the time of unloading a boat, and/or on the length and diameter of the buffer pipe section 44. The duration of each pumping phase can be calculated so as to transfer the full content of the buffer pipe section 44, or slightly less than the full content during each phase. In some examples, the first pumping phase may have a duration of twelve (12) seconds during high tide for example, and the second pumping phase may have a duration of six to eight (6-8) seconds. The cycling of the pump 76 and of the control valves "A", "B", "C" and "D" can be effected by a PLC or other automatic control 82 that is capable of accommodating different uploading conditions and different pumping cycle times.

An example method for moving fish and upload water through the pumping system can described generally as follows: providing a buffer pipe section 44 having a substantial diameter and length, an inlet valve assembly 42 (e.g. including an inline one-way valve) on an upstream end of the buffer pipe section and an outlet valve assembly 46 (e.g. including an inline one-way valve) on a downstream end of the buffer pipe section; providing a fish upload pipe section 40 in fluid communication with the inlet valve assembly 42 and a fish delivery pipe 48 in fluid communication with the outlet valve assembly 46; wherein the upload pipe section and the fish delivery pipe have a same inside diameter as the buffer pipe section; filling the fish upload pipe section 40 and the buffer pipe section 44 with production water; pumping the production water out of the buffer pipe section 44 through the outlet valve assembly 46, thereby drawing upload water and fish by negative pressure through the fish upload pipe section 40; through the inlet valve assembly 42 and partly filling the buffer pipe section 44 with a first haul of upload water and fish 122; pumping production water into the buffer pipe section 44 through the inlet valve assembly 42 and pushing the first haul of upload water and fish 122 along the buffer pipe section 44 and out of the buffer pipe section 44 through the outlet valve assembly 46; repeating the steps of pumping production water out and in the buffer pipe section 44 thereby causing upload water and fish 122 to move through the pumping system.

The fish pumping system described herein has been used successfully to transport 4,000 to 6,000 fish/hr., wherein each fish weighed between 4 and 12 kg. In the installation tested, the fish path piping system had a constant diameter and had a vertical rise of 55 to 60 feet and a horizontal distance of about 400 feet.

In some examples, two (or more) fish pumping systems as described above may be provided together. The pumping phases of each respective system may be out of phase, so that fish are delivered from each fish delivery pipe section to the fish processing plant in an alternating fashion, to provide a generally constant flow of fish.

Figure 7:
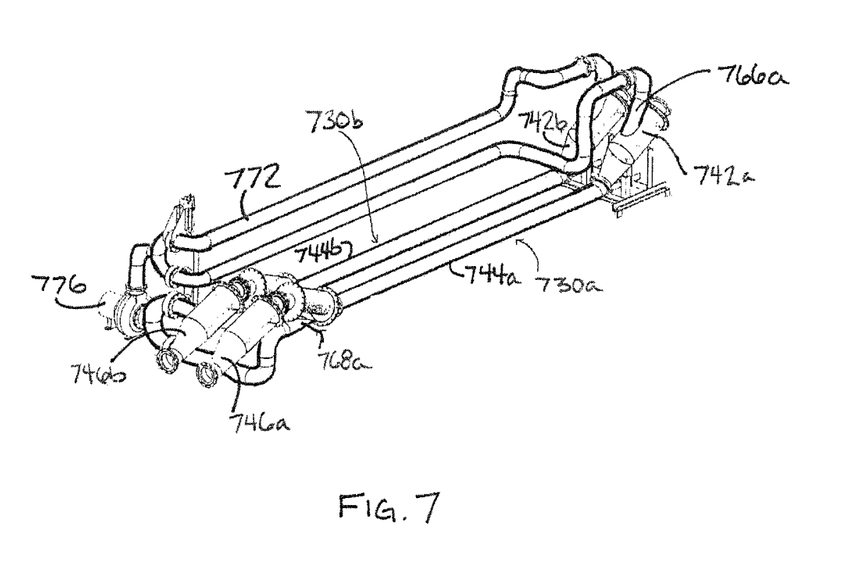
FIG. 7 is a schematic view of an alternative example fish pumping system, which includes two fish path piping sections, and where each fish path piping section forms part of the production water circuit for the other fish path piping section.

Referring now to FIG. 7, an alternative fish pumping system is shown. In FIG. 7, like features as in FIGS. 1 to 6 will be referred to with like reference numerals, incremented by 700.

The system of FIG. 7 includes two fish path piping systems 730a, 730b. The fish path piping system 730a forms part of the production water circuit for the fish path piping system 730b, and vice versa.

Referring still to FIG. 7, the fish path piping system 730a includes an upload pipe section (not shown), a fish delivery section (not shown), and a buffer pipe section 744a. The fish path piping system 730b includes an upload pipe section (not shown), a fish delivery section (not shown), and a buffer pipe section 744b. An inlet valve assembly 742a is at the upstream end of the buffer pipe section 744a, and an outlet valve assembly 746b is at the downstream end of the buffer pipe section 744a. An inlet valve assembly 742b is at the upstream end of the buffer pipe section 744b, and an outlet valve assembly 746b is at the downstream end of the buffer pipe section 744b.

The inlet valve assembly 742a has a water intake branch 766a, and the outlet valve assembly 746a has a water outlet branch 768a. The inlet valve assembly 742b also has a water intake branch (not shown), and the outlet valve assembly 746b also has a water outlet branch (not shown).

The production water circuit includes a first loop 772 that connects the water intake branch 766a of the inlet valve assembly 742a and the water intake branch of the inlet valve assembly 742b to a water pump 776. A second loop 774 connects the water outlet branch 768a of the outlet valve assembly 746a and the water outlet branch of the outlet valve assembly 746b to the water pump 776. As noted above, the buffer pipe section 744a forms part of the production water circuit for the fish path piping system 730b, the buffer pipe section 744b forms part of the production water circuit for the fish path piping system 730a. The system includes various valves (not shown) for isolating the various pipe sections of the system.

In one example, when the system is in use and at steady state, buffer pipe section 744b may be full of fish and water, and the remaining sections may be full of water. The valves may be configured so that when the pump 776 is operated, water is drawn through the outlet branch 768a and pumped towards the water intake branch of inlet valve assembly 742b. This draws water and fish through inlet valve assembly 742a into buffer pipe section 744a, and also pushes fish and water in buffer pipe section 744b through outlet valve assembly 746b, towards the fish delivery section of the fish path piping system 730b.

The pump 776 may be operated until buffer pipe section 744b is filled with water (i.e. when all fish are evacuated) and buffer pipe section 744a is filled with fish and water. The pump 776 may then be momentarily stopped.

The valves may then be configured so that when pump 776 is again operated, water is drawn through the outlet branch of the outlet valve assembly 746b, and pumped towards the water intake branch 766a of inlet valve assembly 742a. This draws water and fish through inlet valve assembly 742b into buffer pipe section 744b, and also pushes fish and water in buffer pipe section 744a through outlet valve assembly 746a, towards the fish delivery section of the fish path piping system 730a.

The pump 776 may be operated until buffer pipe section 744a is filled with water (i.e. when all fish are evacuated) and buffer pipe section 744b is filled with fish and water. The pump 776 may then be momentarily stopped, and the sequence may be repeated to alternately pump fish and water through the fish path piping systems 730a and 730b.

While the above description provides examples of one or more processes or apparatuses, it will be appreciated that other processes or apparatuses may be within the scope of the accompanying claims.

What is claimed is:

1. A fish pumping system for moving upload water and fish, comprising:
   a) an upload pipe section, a buffer pipe section downstream of the upload pipe section, and a fish delivery pipe section downstream of the buffer pipe section,
   b) an inlet valve assembly between the upload pipe section and the buffer pipe section, and an outlet valve assembly between the buffer pipe section and the fish delivery pipe section
   c) an inlet branch pipe extending from the inlet valve assembly and providing a water inlet to the inlet valve assembly, and an outlet branch pipe extending from the outlet valve assembly and providing a water outlet from the outlet valve assembly;
   d) a production water reservoir; and
   e) a production water piping circuit connected to said inlet branch pipe, to said outlet branch pipe, and to said production water reservoir, the production water piping circuit forming a loop with said buffer pipe section, said production water circuit comprising a pump and valves for alternatingly (i) pumping production water from said production water reservoir into said buffer pipe section through said inlet branch pipe, and (ii) pumping production water out from said buffer pipe section through said outlet branch pipe into said production water reservoir, for moving said upload water and fish from said upload pipe section through said buffer pipe section into said fish delivery pipe section.

2. The fish pumping system of claim 1, wherein the upload pipe section, buffer pipe section, and fish delivery pipe section have a same constant inner diameter.

3. The fish pumping system of claim 1, wherein the inlet valve assembly comprises an inlet one way valve between the upload section and the buffer pipe section, and the outlet valve assembly comprises an outlet one way valve between the buffer pipe section and the fish delivery pipe section.

4. The fish pumping system as claimed in claim 3, wherein said outlet branch pipe is upstream from said outlet one-way valve, and said inlet branch pipe is downstream from said inlet one-way valve.

5. The fish pumping system as claimed in claim 1, further comprising a vacuum system for removing air from said buffer pipe section and from said production water piping circuit.

6. The fish pumping system as claimed in claim 1, further comprising a water makeup pipe circuit for recycling said upload water to a fish origin.

7. The fish pumping system as claimed in claim 6, wherein said makeup pipe circuit includes a makeup pump for pumping makeup water into said production water piping circuit.

8. The fish pumping system as claimed in claim 1, further comprising a controller for controlling operation of said pump and said valves.

9. The fish pumping system as claimed in claim 1, wherein said upload pipe section, said buffer pipe section, and said fish delivery pipe section having an inside diameter of between about 10 inches and 14 inches.

10. The fish pumping system as claimed in claim 1, wherein said buffer pipe section has a length of at least 60 feet.

11. The fish pumping system as claimed in claim 1, further comprising a respective strainer in each of said inlet valve assembly and said outlet valve assembly.

12. A method for pumping fish through a buffer pipe section of a fish pumping system, comprising the steps of:
   a) filling said buffer pipe section with production water;
   b) pumping the production water out of said buffer pipe section through a downstream end of said buffer pipe section into a production water reservoir to induce a flow of upload water and fish through an upstream end of said buffer pipe section;
   c) pumping production water from the production water reservoir into said upstream end of said buffer pipe section to induce a flow of said upload water and fish through said buffer pipe section and out of said buffer pipe section through said downstream end of said buffer pipe section into a delivery pipe section downstream of the buffer pipe section.

13. The method as claimed in claim 12, wherein step (b) and step (c) are performed serially.

14. The method as claimed in claim 12, wherein said step of pumping production water out of said buffer pipe section through said downstream end of said buffer pipe section comprises pumping production water through an outlet branch pipe in fluid communication with said downstream end of said buffer pipe section, and said step of pumping production water into said upstream end of said buffer pipe section comprises pumping production water through an inlet branch pipe in fluid communication with said upstream end of said buffer pipe section.

15. The method as claimed in claim 14, further comprising the step of passing the production water through a strainer prior to pumping the production water into the outlet branch pipe.

16. The method as claimed in claim 12, wherein steps (b) and (c) are repeated serially at about 20 second intervals.

17. The method as claimed in claim 12, wherein said buffer pipe section has an inlet valve assembly at an upstream end thereof and an outlet valve assembly at a downstream end thereof, and the method further comprises the step of inhibiting said production water from passing through said outlet valve assembly.

* * * * *